Sept. 27, 1927.

M. H. GREGG

TIRE VULCANIZER 1,643,493

Original Filed Jan. 23, 1926  2 Sheets-Sheet 1

INVENTOR
MARK H. GREGG
BY
George F. Ballay
ATTORNEY

Sept. 27, 1927.  M. H. GREGG  1,643,493
TIRE VULCANIZER
Original Filed Jan. 23, 1926   2 Sheets-Sheet 2
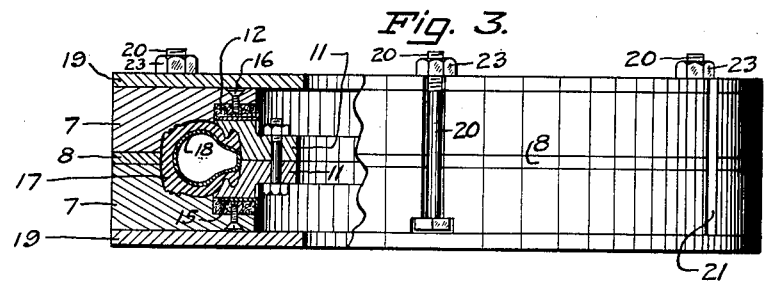
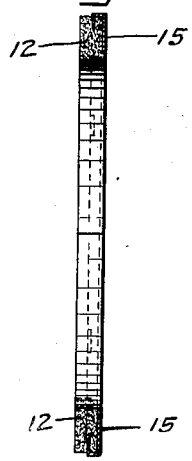
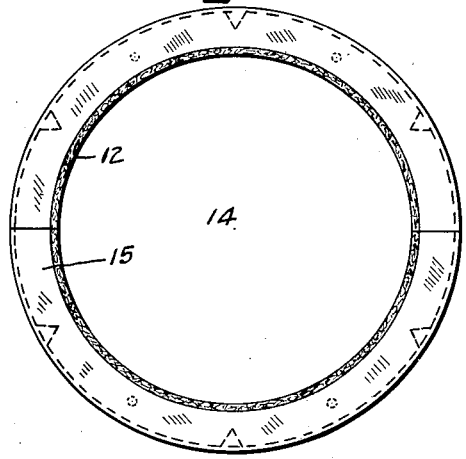
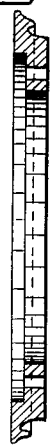
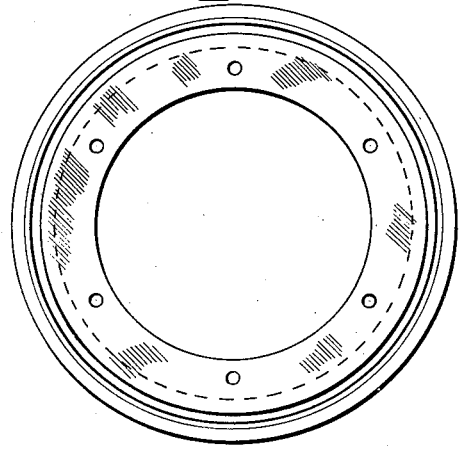
INVENTOR
MARK H GREGG
BY
ATTORNEY Patented Sept. 27, 1927.

1,643,493

UNITED STATES PATENT OFFICE.

MARK H. GREGG, OF OAKLAND, CALIFORNIA.

TIRE VULCANIZER.

Application filed January 23, 1926, Serial No. 83,283. Renewed March 1, 1927.

This invention relates to that class of apparatus known as rebuilding or retreading tire molds used for vulcanizing a new outer surface to the carcass of old and worn tires.

The invention more particularly relates and is an improvement upon the invention set forth in the patent of John W. Hughes patented February 3, 1925, No. 1,524,866.

An object of that invention was the provision made in which the mold could be laterally expanded to adapt itself to different width tires and treads by dividing the mold laterally and placing an interchangeable spacing ring at the tread portion of the mold between the inner lateral surfaces thereof, and thereby provide a tire vulcanizer adapted to receive a tire of nominal size and of over-size, and various makes of tires having different widths, and retread same in one mold.

A further object of that invention was the providing of an improved steam generating or heating apparatus surrounding the mold, the said heating apparatus and mold being divided circumferentially and provided with means for holding the various sections together against internal pressures during vulcanization.

In the above method of expanding the mold laterally by placing an interchangeable spacing ring at the tread portion of the mold only, much trouble is caused by the vacant space thus made at the bead portion of the mold, the internal pressures produced during vulcanization having a tendency to force the air bag into this space and weaken the air bag and also distort the tire.

It is one of the objects of the present invention to improve the construction of this type of vulcanizers so that the mentioned trouble will be eliminated.

It is another object of the present invention to improve the construction of tire vulcanizers so as to stop the excessive heat that is required for vulcanizing a new tread on the tire at such a point and in such a manner as to eliminate all possibility of over-curing the bead portion of the tire. The matter of over-curing the bead portion of the tire while retreading same and thus weaken the tire has been a very serious problem in tire vulcanizing, and it is to be noted that in the present invention the heat is not reduced through radiation, but that it is actually stopped by inserting heat insulating material between that portion of the mold that covers the exterior portion of the bead and that portion of the mold that covers the side wall and tread of the tire.

It is also an object of the invention to pivotally connect the two sections of the heating apparatus together and thereby insure perfect alignment, and simplify the closing.

The invention possesses other objects and features of advantage, some of which, with the foregoing, will be made manifest in the following description of the preferred form of the invention which is illustrated in the drawings accompanying and forming part of the specification.

It is to be understood that it is not intended to limit the invention to the embodiment shown by said drawings and descriptions, as variations may be adopted within the scope of the invention as set forth in the claims.

In the accompanying drawings:

Figure 3 is a partial sectional view of the mold proper removed from the vulcanizer ready for disassemblage.

Figure 4 is a central sectional view of one of the heat insulating rings used in the invention.

Figure 5 is a plan of one of the heat insulating rings.

Figure 6 is a central sectional view of one of the bead rings.

Figure 7 is a plan of the bead ring.

Figure 1:
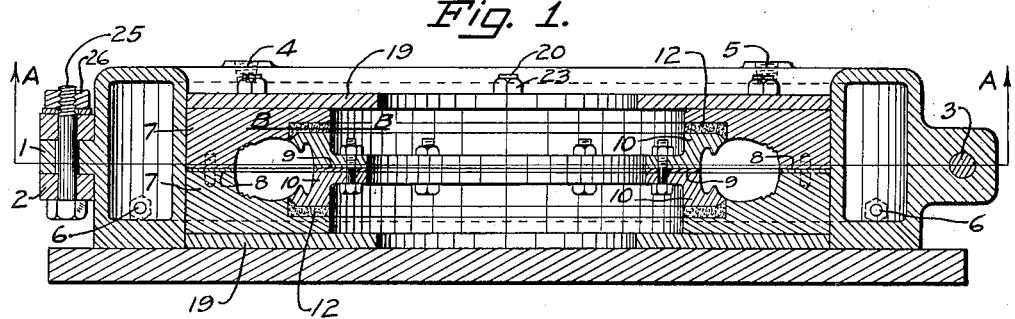
Figure 1 is a longitudinal sectional view of one type of vulcanizer involving the invention.

According to the construction shown, the numeral 1 designates a half circumferential chamber and is pivotally connected to a similar chamber 2; the said chambers being adapted to be closed and securely fastened together by the bolt 3, thereby forming a complete circular section hereinafter called the heating chamber. Provision is made for the circulating of steam in said heating chamber through inlets and outlets 4 and 5 respectively. Drain plugs 6 are also provided.

Figure 2:
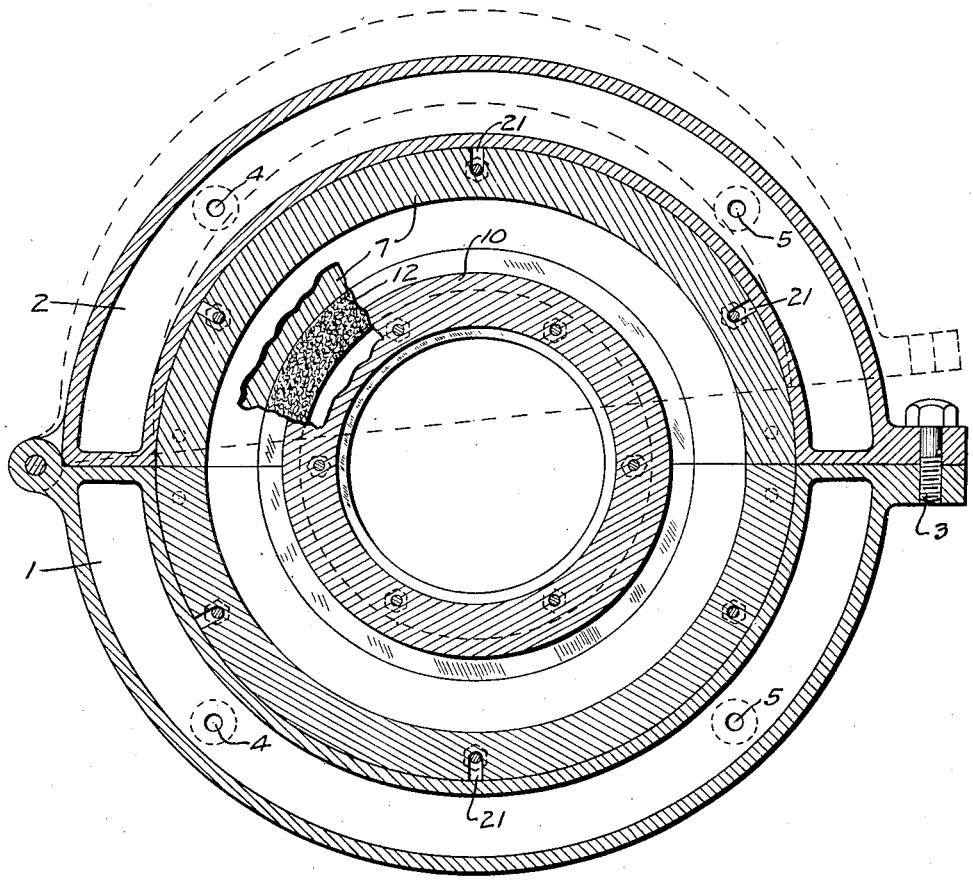
Figure 2 is a sectional view taken on line A—A of Figure 1 with a broken section therein taken on line B—B of Figure 1.

The mold 7 is laterally and circumferentially divided, thus forming four matrices that are identical, and when assembled as shown in Figures 1 and 2 form a single and continuous uninterrupted matrix. An interchangeable spacing ring 8 is placed within the mold at the tread end and between the matrices thereof to space the matrices the desired distance apart when retreading tires of various widths. It is to be noted that by placing spacing rings of different widths between the matrices within the mold at the tread end only, causes an opening to be formed between the inner faces of the bead rings, and also that the internal pressures caused by vulcanization will have a tendency to distort the tire by forcing a portion of the air bag into said opening. Another spacing ring 9 is therefore provided, the said ring being of the same width as the spacing ring 8, and is placed between the bead rings 10 as shown in Figure 1, thus closing the opening between said bead rings. Another method used especially when retreading certain makes of tires of a considerable difference in width is to provide special bead rings 11 as shown in Figure 3, that are laterally divided the same as in Figure 1, but are of such a width that when a spacing ring 8 is placed between the matrices at the tread end of the mold, the inner lateral faces of said bead rings 11 completely close as shown in Figure 3.

The numeral 17 in Figure 3 represents a tire placed in the mold ready to be vulcanized and the numeral 18 the air bag therein. An annular pressure plate 19 is shown placed on the mold and a plural number of bolts 20 in the slots 21, provided with nuts 23 are used to embrace the mold parts and draw them laterally to position as shown in Figure 3.

As hereinbefore mentioned one of the very important objects of this invention is the provision made for preventing the excessive heat required for vulcanizing from reaching the bead portion of the mold and thus eliminate all possibility of over-curing the bead portion of the tire. A preferred type of such means is illustrated in Figures 1, 2, 3 and 4, and consists in the providing of asbestos or other heat insulating material 12 and inserting the said material between the outer surface of the bead ring at a point that covers the bead portion of the tire and the mold that covers that portion of the bead ring.

In the present illustration the heat insulating material is shown as being composed of asbestos formed circular in shape, having an opening 14 therein; also circumferentially divided; and as being fastened to a thin metal piece 15 that covers a portion of one of the lateral faces thereof as shown in Figure 4. Said metal piece 15 rests against the bead rings 11 and is provided to give strength to the asbestos rings 12 and to reduce wear thereon while in use. The heat insulating rings thus formed are then mounted in each lateral half of the mold and substantially fastened thereto by screws 16 as shown in Figure 3.

From the foregoing it will be observed that the bead ring can be practically completely insulated from the direct heat of the mold by inserting a large amount of the asbestos material, or partially insulated to regulate the heat to the desired temperature, depending upon the amount of the material used and the manner in which it is applied.

It is to be understood that any type of heat insulating material may be used and applied in any manner to procure the best results and that the improvements may be embodied on any type of vulcanizer or tire mold, which obviously may be built up in any suitable manner, the present illustration not being utilized as indicating the only form of vulcanizer or tire mold onto which the parts may be mounted.

Having thus illustrated and described a certain form of construction and arrangement of parts pertaining to the invention, it is desired to include in this application for Letters Patent of the United States all that comes within the range of the invention as set forth in the claims hereinafter mentioned.

What is claimed:

1. A tire vulcanizer having in combination a heating chamber with an opening therethrough, a full circle retreading tire mold adapted to fit in said opening, the said tire mold consisting of halved annular sectional matrices, annular bead ring sections and annular heat insulating sections, the said heat insulating sections being adapted for insertion between the outer lateral surface of the bead rings and the mold, and means for clamping said sections laterally together.

2. A tire vulcanizer comprising a heating chamber having an opening therethrough, a retreading tire mold adapted to fit in said opening consisting of annular sectional matrices, annular bead ring sections, and annular heat insulating sections having metal on one of the lateral faces thereof, and adapted for insertion around the side wall and bead portion of the mold between the said bead rings and mold matrices for the purpose of preventing excessive heat reaching the bead of the tire during vulcanization.

3. A tire vulcanizer having a tire mold provided with heat insulating material on the side wall and bead portion of the mold for the purpose of preventing over curing the side wall and bead of the tire during vulcanization.

In testimony whereof, I hereunto affix my signature.

MARK H. GREGG.